United States Patent [15] 3,673,515
Kersten et al. [45] June 27, 1972

[54] EMITTER ELECTRODE CURRENT CONTROLLED AMPLITUDE MODULATOR

[72] Inventors: Karl-Heinz Kersten; Wolfgang Patschan, both of Heilbronn, Germany

[73] Assignee: Telefunken Patentverwertungsgesellschaft m.b.H., Ulm/Danube, Germany

[22] Filed: Nov. 25, 1969

[21] Appl. No.: 879,859

[30] Foreign Application Priority Data

Nov. 30, 1968 Germany ....................P 18 11 943.2

[52] U.S. Cl. ....................332/31 T, 307/240, 307/264, 307/318, 330/9, 332/38

[51] Int. Cl. ....................H03c 1/06

[58] Field of Search ....................332/31, 31 T, 38, 63; 307/264, 307/318, 297, 240; 330/9

[56] References Cited

UNITED STATES PATENTS

| | | | |
|---|---|---|---|
| 2,970,282 | 1/1961 | Hofer et al. | 332/38 |
| 3,106,646 | 10/1963 | Carter | 307/318 X |
| 3,260,966 | 7/1966 | Murray | 332/31 T |
| 3,282,631 | 11/1966 | Mosinski | 307/297 X |
| 3,523,198 | 8/1970 | Keller | 307/318 X |
| 3,562,673 | 2/1971 | Caspari | 332/31 T |

*Primary Examiner*—Alfred L. Brody
*Attorney*—Spencer & Kaye

[57] ABSTRACT

A circuit arrangement for amplitude modulation comprises a controllable component such as a transistor driven by the signal to be modulated and whose emitting electrode is connected to a current source, such as a further transistor, the current delivered from the current source to the controllable component being varied in magnitude by the modulation signal.

11 Claims, 3 Drawing Figures

*Inventors.*
Karl-Heinz Kersten
Wolfgang Patschan
BY Spencer & Kaye
ATTORNEYS.

INVENTORS.
Karl-Heinz Kersten
Wolfgang Patschan
BY Spencer & Kaye
ATTORNEYS.

EMITTER ELECTRODE CURRENT CONTROLLED AMPLITUDE MODULATOR

BACKGROUND OF THE INVENTION

This invention relates to a circuit arrangement for amplitude modulation.

Circuits for amplitude modulation are known in numerous constructions and variants and generally consist, except where it is a question of circuits such as rectifier modulators and the like built up with diodes, of at least one controllable component such as a vacuum tube, transistor etc., to which the signal to be modulated is supplied at the control electrode and the supply voltage of which is varied in time with the modulation signal in order to obtain the modulation. This is generally effected by the secondary winding of a modulation transformer being connected in series with the supply voltage in the collector or anode circuit of the controllable component, which transformer is controlled with the modulation signal at the primary side and varies the magnitude of the effective supply voltage in time with the modulation frequency by means of its secondary voltage. In these known circuits, the modulated signal is then taken off at an impedance which is connected into the circuit of the controllable component and which generally consists of a resonant circuit tuned to the frequency of the signal to be modulated.

The known circuits, which are frequently referred to as circuits for anode or collector voltage modulation, nevertheless have the disadvantage that the signal supplied thereby has very considerable distortion with high modulation factors. In addition, the transformer necessary for coupling in the modulation signal in these circuits is extremely inconvenient because of its size and weight, particularly when the circuits are to be used as modulation stages in small portable transmitters.

SUMMARY OF THE INVENTION

It is the object of the present invention to provide a circuit arrangement for amplitude modulation which does not have these disadvantages found in known circuits.

According to the invention, there is provided a circuit arrangement for amplitude modulation comprising a controllable component driven by the signal to be modulated and having an emitting electrode, a current source, the current from which has a magnitude which is varied by the modulation signal and means for connecting said current source to said emitting electrode.

BRIEF DESCRIPTION OF THE DRAWINGS

The invention will now be described in greater detail, by way of example, with reference to the accompanying drawings, in which.

DESCRIPTION OF THE PREFERRED EMBODIMENTS

Figure 1:
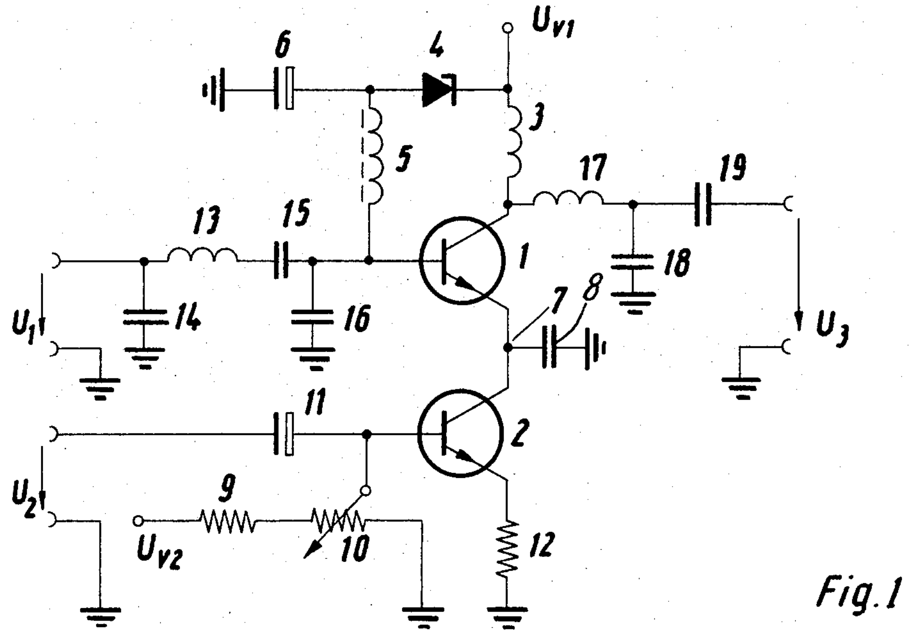
FIG. 1 is a circuit diagram of a circuit arrangement according to a first embodiment of the invention.

Basically, in a circuit arrangement for amplitude modulation in accordance with the invention, the emitting electrode of the controllable component to which the signal to be modulated is applied is connected to a current source, the current from which, supplied to this component, is varied in magnitude by the modulation signal.

The particular nature of the controllable component used is of subordinate importance for the general circuit principle on which the present invention is based. Accordingly, it lies within the scope of the present invention to use in the circuit according to the invention field effect transistors or even vacuum tubes, apart from conventional transistors with a collector region, base region and emitter region. For this reason, the emitting electrode is understood to mean in general that electrode of a controllable component which, like the cathode of a vacuum tube, the emitter of a depletion-layer transistor, or the source of a field effect transistor, supplies the charge carriers in the control region of the component in question.

The particular advantages of the modulation circuit according to the invention lie firstly in the absence of the transformer for coupling the modulation signal, which is indispensable in the known circuits as indicated above and is extremely inconvenient for many applications. In addition, the circuit according to the invention also has the advantage that it delivers modulated signals with only slight distortion even with high modulation factors and in addition still works satisfactorily even with very low supply voltages which, like the absence of the modulation transformer, is a particular advantage when the circuit according to the invention is used in portable transmitters.

In the circuit according to the invention, the modulated signal is taken off at an impedance which is connected into the circuit of the controllable component controlled by the signal to be modulated. If a transistor is provided for example, as is appropriate in circuits according to the invention for low battery voltages, then this reactance is preferably connected into the collector circuit of the transistor.

A transistor is particularly suitable as a current source which supplies the current through the component controlled by the signal to be modulated, in the circuit according to the invention. This transistor is then driven across its base-to-emitter path for example by the modulation signal, this signal preferably being supplied to the base of this transistor acting as a current source. It should be pointed out, however, that the invention is not restricted to the use of such a current source consisting of a transistor. Instead, any circuits which, within certain limits supply constant current independently of the magnitude of the applied load and in which the magnitude of this current can be varied electronically, that is to say with the modulation signal, are suitable as a current source.

Now if in a specific embodiment of the modulator according to the invention, one transistor is provided as a control component and one as a current source, then these two transistors may have the same polarity for example, that is to say either transistors of the NPN type or those of the PNP type are used on the modulator in question. The emitter of the transistor driven by the signal to be modulated, which for the sake of simplicity is hereinafter termed merely the first transistor, is then connected to the collector of the second transistor, that is to say the one acting as a current source.

In another embodiment of the circuit arrangement according to the invention, the first and second transistors have the opposite polarity, that is to say one transistor of the NPN type and one of the PNP type are used in the modulator in question and are then connected to one another by their emitter terminals.

It has been found that very low operating voltages can be obtained for this specific embodiment of the invention, if care is taken, by appropriate circuitry, to ensure that the direct-current potential at the base of the first transistor has a constant value regardless of the modulation signal and of the signal to be modulated and at the same time there is a low-resistance connection for the modulation signal between this base of the first transistor and the neutral point of the circuit. Care must, however, be taken to ensure by appropriate dimensioning of the components used, that this connection has a high resistance for the signal to be modulated in order to avoid undesirable weakening of this signal. At this point, it appears important to explain that the neutral point of the circuit is understood to mean that point inside the circuit to which all the alternating voltage signals of the circuit are related. The fact that this point is also at ground potential at the same time with regard to alternating voltage or direct voltage is not absolutely essential.

The low-resistance connection for the modulation signal can be realized in a simple manner in the circuit according to the invention with an adequate difference in frequency between this signal and the signal to be modulated, by the base of the first transistor being connected to the neutral point of the circuit by an inductance which has a high impedance for the signal to be modulated and by a capacitor for the direct voltage separation.

The direct-current potential at the base of the first transistor is maintained constant, for example by means of a Zener diode, which is connected in parallel as regards direct voltage with the base-to-collector path of this transistor.

It is also possible, however, to achieve the stabilization of the base voltage potential by providing a voltage divider between the two poles of the supply feeding the circuit, which voltage divider consists of one or more diodes connected in series and a resistor, and which is connected in parallel with the base-to-collector path of the first transistor by this resistor.

Regardless of the specific embodiment, in all the modulation circuits according to the invention, the modulation comes about as a result of the fact that a current signal which is supplied by the current source and fluctuates in magnitude with the modulation signal, is varied by the controllable component in time with the signal to be modulated so that the required amplitude-modulated signal is then formed from this current, which is dependent both on the modulation signal and on the signal to be modulated, in an impedance which generally consists of a resonant network tuned to the frequency of the signal to be modulated.

Referring now to FIG. 1, there is shown a preferred embodiment of the circuit according to the invention which is built up with the two transistors 1 and 2 of the same polarity, and wherein the transistor 1 is driven by the signal $U_1$ to be modulated and the transistor 2, serving as a current source, is driven by the modulation signal $U_2$. The inductance 3, which together with circuit capacitances and in particular also the collector-to-emitter capacitance of the transistor 1, forms a parallel resonant circuit from which the modulated signal $U_3$ is taken off, is connected into the collector circuit of the transistor 1. In order to obtain a constant direct-current potential for the base of the transistor 1, a Zener diode 4 is provided which connects the base of the transistor 1 to the supply voltage $U_{v1}$ through an inductance 5. Together with the capacitor 6, the inductance 5 also ensures at the same time a low-impedance connection for the modulation signal between the base of this transistor and the neutral point of the circuit which in this specific embodiment of the invention corresponds to the ground point.

As illustrated in FIG. 1, the emitter of the transistor 1 is connected to the collector of the transistor 2, the junction point 7 likewise being connected to the neutral point of the circuit through the capacitor 8. The size of this capacitor is selected so that it is scarcely effective for the low-frequency modulation signal whereas it represents a short-circuit for the signal to be modulated which is of considerably higher frequency. In order to stablilize the operating point, a resistor 12 is provided in known manner in the emitter circuit of the transistor 2 which derives its base bias from the voltage $U_{v2}$ through a voltage divider consisting of the resistor 9 and the potentiometer 10, and to the base of which the modulation signal is supplied through the coupling capacitor 11. In order to match the input resistance of the transistor 1 to preceding stages, a matching pad consisting of the inductance 13 and the capacitors 14, 15 and 16 is provided at the base of this transistor. A second such matching pad, which is composed of the inductance 17 and the capacitors 18 and 19, is in the output circuit of the modulator shown. Neither matching pad is necessary, in principle, for the mode of operation of this circuit, and if the frequency of the signal to be modulated is appropriately low or the matching of the input and output resistance respectively of the circuit is already effected by other means at preceding or following circuit units, they may be omitted.

Figure 2:
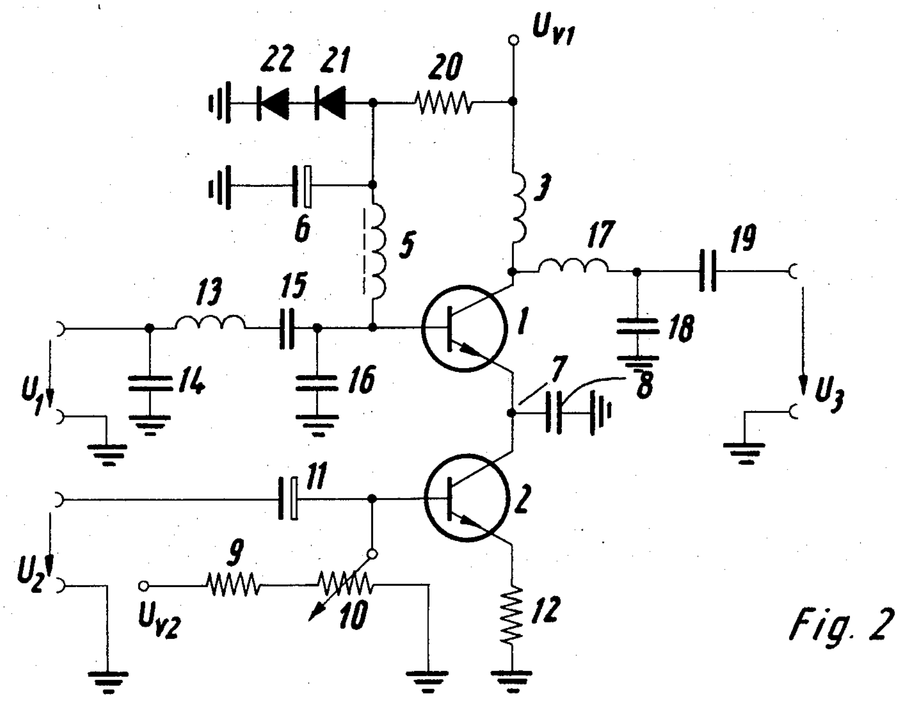
FIG. 2 is a circuit diagram of a circuit arrangement according to a second embodiment of the invention.

FIG. 2 shows a further example of an embodiment of the modulator according to the invention. In its construction, this circuit corresponds essentially to the modulator described with reference to FIG. 1. The stabilization of the base potential of the transistor 1, however, is here effected not by means of a Zener diode but by means of a voltage divider, consisting of the resistor 20 and the diodes 21 and 22, which is connected between supply voltage $U_{v1}$ and neutral point of the circuit and is connected in parallel, by its resistor, with the base-to-collector path of the transistor 1 as regards direct voltage. For the sake of completeness, mention may also be made of the fact that the supply voltages $U_{v1}$ and $U_{v2}$ in the two circuits illustrated in FIGS. 1 and 2 may, of course, also be supplied by a single source.

Figure 3:
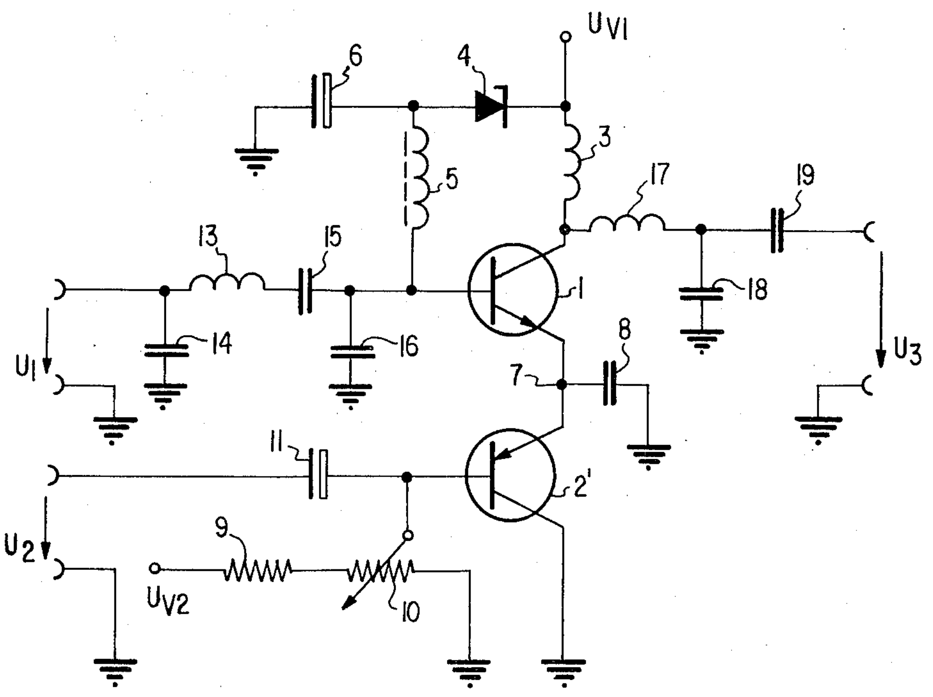
FIG. 3 is a circuit diagram illustrating a modification of the circuit of FIG. 1.

FIG. 3 shows a modification of the circuit of FIG. 1 wherein opposite polarity transistors are used for the controllable element and the current source. As shown, the NPN current source transistor 2 is replaced by a PNP transistor 2' whose emitter is connected to the emitter of transistor 1 and whose collector is directly connected to ground, i.e. no resistor such as resistor 12 of FIG. 1 is provided. Other than these changes the circuits of FIGS. 1 and 3 are identical and corresponding elements in FIG. 3 have the same reference numerals. Although not illustrated it is of course understood that the circuit of FIG. 2 may be similarly modified.

The circuits illustrated in the Figures have extremely satisfactory modulation characteristics, as measurements have shown. Above all, these circuits can still be operated satisfactorily even at low supply voltages, for example supply voltages of 12 volts, and at the same time deliver modulated signals which have only slight distortion even with a high modulation factor. Some measured values in this connection are reproduced in the following summary. In this summary, $m$ is the modulator factor and $k$ is the harmonic distortion determined for the modulation factor in question.

| | |
|---|---|
| $m$= 60% | $k$< 1% |
| $m$= 80% | $k$= 4% |
| $m$= 95% | $k$= 9% |
| $m$=100% | $k$=10% |

It will be understood that the above description of the present invention is susceptible to various modifications, changes and adaptations.

What I claim as new and desire to secure by Letters Patent of the United States is:

1. A circuit arrangement for the amplitude modulation of a signal comprising: a current source including a first transistor; means for supplying the modulation signal to said current source to vary the output current therefrom in accordance with the magnitude of said modulation signal; a second transistor having an emitting electrode; means for supplying the signal to be modulated to the base of said second transistor to drive same; means for connecting said current source to said emitting electrode; a source of supply voltage; means for connecting said current source transistor to said supply voltage source in series with said second transistor; output means for said second transistor for providing the desired amplitude modulated output signal, said output means including an impedance connected into the collector circuit of said second transistor and means for taking off the modulated signal from the collector of said second transistor; means for maintaining the direct-current potential constant at said base of said second transistor; and means for establishing a connection, of low impedance for only the modulation signal, between said base of said second transistor and the neutral point of the circuit common to all the signals.

2. A circuit arrangement as defined in claim 1, wherein said means for supplying the modulation signal to the current source supplies same to the base of said current source transistor.

3. A circuit arrangement as defined in claim 2, wherein: said first transistor has the same polarity as said second transistor and said means for connecting said current source to said emitting electrode connects the emitter of said second transistor to the collector of said first transistor.

4. A circuit arrangement as defined in claim 2, wherein: said first transistor has the opposite polarity from said second transistor, and said means for connecting said current source to said emitting electrode connects said transistors by their emitter terminals.

5. A circuit arrangement as defined in claim 1, wherein said connection establishing means comprises a capacitor and an inductance having a high reactance for the signal to be modulated.

6. A circuit arrangement as defined in claim 1, wherein said direct-current potential maintaining means comprises a Zener diode connected in parallel with the base-to-collector path of said second transistor as regards direct current.

7. A circuit arrangement as defined in claim 1, wherein said direct-current potential maintaining means comprises a voltage divider, including one or more diodes connected in series and a resistor, connected in parallel, by said resistor, with the base-to-collector path of said second transistor, as regards direct current, and between said source of two poles of the supply voltage.

8. A circuit arrangement for the amplitude modulation of a signal comprising: a current source including a first transistor; means for supplying the modulation signal to said current source to vary the output current therefrom in accordance with the magnitude of said modulation signal; a second transistor having an emitting electrode; means for supplying the signal to be modulated to the base of said second transistor to drive same; means for connecting said current source to said emitting electrode; a source of supply voltage; means for connecting said current source transistor to said supply voltage source in series with said second transistor; and output means for said second transistor for providing the desired amplitude modulated output signal, said output means including an inductance connected into the collector circuit of said second transistor and means for taking off the modulated signal from the collector of said second transistor, said inductance forming a parallel resonant circuit tuned to the frequency of the signal to be modulated with the circuit capacitances and in particular the collector-to-emitter capacitance of said second transistor.

9. A circuit arrangement as defined in claim 8 wherein said means for supplying the modulation signal to the current source supplies same to the base of said first transistor.

10. A circuit arrangement as defined in claim 9 wherein said first transistor has the same polarity as said second transistor, and said means for connecting said current source to said emitting electrode connects the collector of said first transistor to the emitter of said second transistor.

11. A circuit arrangement as defined in claim 9 wherein said first transistor has the opposite polarity from said second transistor, and said means for connecting said current source to said emitting electrode connects said transistors by their emitter terminals.

* * * * *